United States Patent [19]

Harting et al.

[11] 4,197,753

[45] Apr. 15, 1980

[54] STRAIN GAGE

[75] Inventors: Darrell R. Harting, Seattle; Richard L. Egger, Bellevue, both of Wash.

[73] Assignee: The Boeing Company, Seattle, Wash.

[21] Appl. No.: 872,849

[22] Filed: Jan. 27, 1978

Related U.S. Application Data

[63] Continuation of Ser. No. 458,596, Apr. 8, 1974, abandoned, which is a continuation-in-part of Ser. No. 296,969, Oct. 12, 1972, abandoned, which is a continuation of Ser. No. 33,398, Apr. 30, 1970, abandoned.

[51] Int. Cl.² ............................................. G01B 7/16
[52] U.S. Cl. ..................................... 73/766; 73/780
[58] Field of Search ................ 73/766, 773, 779, 780, 73/15.6

[56] References Cited

U.S. PATENT DOCUMENTS

| | | | |
|---|---|---|---|
| 2,961,872 | 11/1960 | Metzmeier et al. | 73/773 |
| 3,206,970 | 9/1965 | Dally et al. | 73/780 |
| 3,293,909 | 12/1966 | Gledhill | 73/15.6 |
| 3,295,365 | 1/1967 | Larrigan et al. | 73/779 |

OTHER PUBLICATIONS

Foldvari et al., "Capacitive Transducers" In Instruments and Control Systems, pp. 77–85.

*Primary Examiner*—Herbert Goldstein
*Attorney, Agent, or Firm*—Thomas H. Murray

[57] ABSTRACT

A strain gage particularly suited for use in detecting and measuring mechanically induced strain in thermally strained specimens including an elongated link, adapted to be fixedly secured to the surface of a specimen, having thermal expansion characteristics matched with those of the specimen, and characterized by a differential capacitor employed for detecting strain induced motion as such motion is effected between the link and the surface of the specimen.

10 Claims, 7 Drawing Figures

STRAIN GAGE

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

CROSS-REFERENCES TO RELATED APPLICATIONS

This is a continuation of application Ser. No. 458,596 filed Apr. 8, 1974, now abandoned which application is a continuation-in-part of application Ser. No. 296,969 filed Oct. 12, 1972, now abandoned which is a continuation of application Ser. No. 33,398, filed Apr. 30, 1970, and now abandoned.

BACKGROUND OF THE INVENTION

1. Field of the Invention

The invention relates to strain gages and more particularly to strain gages adapted to be employed in an environment wherein elevated temperatures operatively are encountered.

2. Description of the Prior Art

The prior art is replete with strain gages for measuring strain resulting from mechanical stress. Attempts have been made to employ various types of known strain gages in measuring mechanical strain imparted to specimens while the specimens are maintained at elevated temperatures, and accordingly are subjected to thermal expansion strain. However, such attempts have not always met with success as various impediments normally are encountered. For example, where optical techniques are employed in measuring mechanically imparted strain, in samples subjected to thermal inputs, an attendant inability to effectively cancel thermal expansion strain persists. Where the techniques being employed require the use of devices based on a change in capacitance, an attendant change in dielectric constant and an inability to adequately cancel the effects of the source of thermal energy have impeded the use of such devices. Where devices, such as the device disclosed in U.S. Pat. No. 3,293,909, are employed, such devices fail to totally satisfy existing needs since these devices do not readily accommodate real-time observation of performance.

SUMMARY OF THE INVENTION

In accordance with the present invention, many of the aforementioned difficulties of prior art strain gages are overcome through the use of a simplified gage which employs a differential capacitor in combination with a displaceable link secured to at least one point on a specimen subjected to mechanical strain.

Specifically, there is provided a strain gage for use in detecting and measuring mechanically induced strain in a specimen comprising: (1) an elongated link extending along the surface of the specimen and having thermal expansion characteristics essentially the same as those of the specimen; (2) adaptable means for affixing the link to the surface of the specimen such that the link is movable relative thereto when the specimen is mechanically strained in a direction along the length of the link; and (3) position detecting means including a differential capacitor coupled with the link and said surface of the specimen for detecting movement therebetween, the differential capacitor including plate means on the link and plate means affixed to the specimen with the space between the two being empty except for nothing more than a gaseous medium having a dielectric constant which is essentially temperature invariant.

It is an essential feature of the invention that the space between the plates of the differential capacitor be empty, except for a gaseous medium. In most cases, the strain gage will be operated in the ambient atmosphere so that the dielectric will comprise air. However, it is also possible to operate the gage in a controlled atmosphere of a specified gas or gas mixture or even under vacuum conditions. Since there is no perfect vacuum and any evacuated enclosure contains at least some gas molecules, the term "gaseous medium" as used in this specification and claims is intended to include what is normally referred to as a "vacuum". The essential point is that the space between the capacitor plates be devoid of any liquid or solids and that there be no frictional contact between the capacitor plates.

It is also necessary that the capacitor means be of the differential type wherein one capacitor plate on one of two movable elements moves between capacitor plates on the other element. In this manner, two of the plates of the capacitor means can be included in opposite legs of a bridge circuit such that variations due to temperature and other factors will cancel out.

In the first, and principal, embodiment of the invention, the aforesaid link is affixed at only one end to the surface of a specimen to be tested; while the other, free and carries first capacitor plate means forming part of the differential capacitor. Second capacitor plate means, consisting of two plates, surrounds the first plate means and is secured to the specimen at a point spaced from the connection of the link to the specimen. With this arrangement, displacement of the first and second plate means relative to each other will be an indication of the mechanical strain induced in the specimen along the axis of the link. Therefore, by connecting the differential capacitor in a bridge circuit configuration, an electrical signal can be derived which is proportional to the mechanical strain induced in the specimen.

Instead of deriving an output proportional to displacement of the differential capacitor plates, another embodiment of this invention incorporates means for heating the link, wherein any displacement occurs to maintain the differential capacitive sensor at a null position, thus making the link equal to the specimen length when the specimen is being strained mechanically. In this case, a thermopile connected between the heated link and the specimen provides an output indicative of mechanical strain.

It is to be understood that the embodiments of this invention have utility as an electric strain gage for measuring deformations of a specimen over a wide temperature range as it is variably strained in either mechanical tension or compression. The various embodiments are adaptable for use on complex specimen shapes and locations so as to fully conform to the variations in mechanical strain thereof as the mechanical strain varies.

The above and other objects and features of the invention will become apparent from the following detailed description taken in connection with the accompanying drawings which form a part of this specification, and in which.

DESCRIPTION OF THE PREFERRED EMBODIMENTS

First Embodiment

Figure 1:
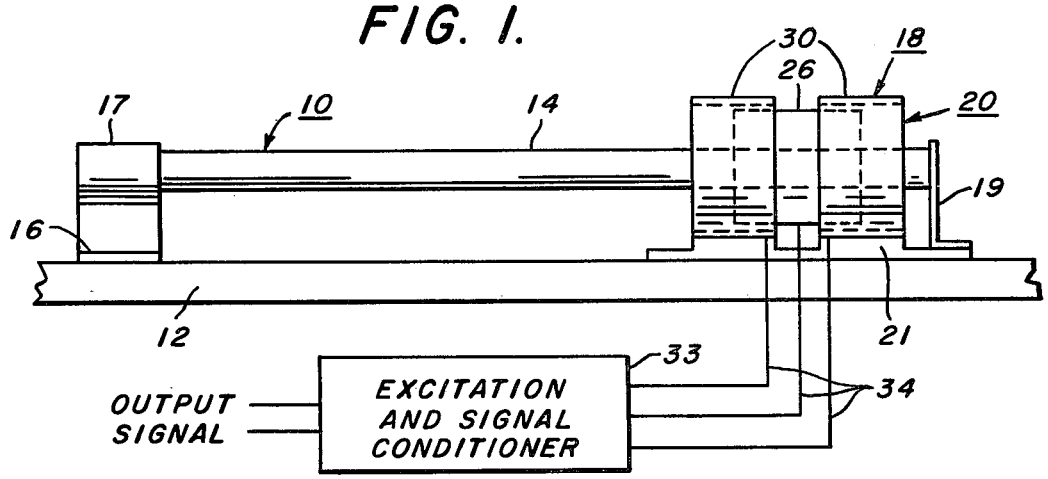
FIG. 1 is a side elevation of a first embodiment of the instant invention.

Referring now to the drawings wherein like reference characters designate like or corresponding parts throughout the several views, there is shown in FIG. 1 a strain gage 10, which is a first embodiment of the instant invention, attached to a surface of a specimen 12. This gage is, in effect, a temperature-compensating capacitive strain gage. Consequentially, the effects of thermally induced expansion or contraction of the specimen 12, commonly called thermal expansion strain, are canceled and strain is not detected, so long as the specimen 12 is not mechanically strained. Preferably, this condition prevails for a wide range of temperature between, for example, room temperature and 1500° F.

As illustrated in FIG. 1, the strain gage 10 is mounted on the specimen 12 and is employed in either compression or tension and at elevated temperature. Fur purposes of describing the invention, it will be assumed that the specimen 12 is in an environment wherein it is subjected to tensile stress at elevated temperatures and, consequently, experiences elongation due to thermal expansion strain, as well as mechanical strain which results from a mechanical loading thereof.

Mounted along one surface of the specimen 12 is an elongated bar or link 14, preferably of a tubular or rod configuration, formed of a material having thermal characteristics matched with the thermal characteristics of the material of the specimen 12. Preferably, material from which the link 14 is fabricated is that of the specimen 12. It may, however, differ so long as the relationship of the characteristics of the materials, over the operating range, is a known factor. The link 14 rigidly is secured at one end thereof to the surface of the specimen 12 through a suitable bracket 16. The bracket is fixed to the surface of the specimen 12 through any convenient means, including commercially available high temperature cements, welds and the like. The bracket 16 includes a unitary sleeve 17 which, in effect, serves as a receptacle for receiving therein one end of the link 14 which rigidly is coupled with the sleeve 17 and, therefore, rigidly is secured to the specimen 12.

Adjacent the opposite end of the link 14 is a position detector 18 also fixedly secured to the surface of the specimen 12. The purpose of the detector 18 is to detect relative displacement occurring between the link 14 and the surface of the specimen 12 as the latter is strained. Particular aspects of the type and design of the position detector 18 used for detecting said relative displacement are important to the intended use, operation and performance of the instant invention. Although the position detector need not be limited to a specific type or design, the specific position detector described below, based on a differential capacitor with an air or vacuum dielectric, does incorporate the design aspects that are important.

Figure 2:
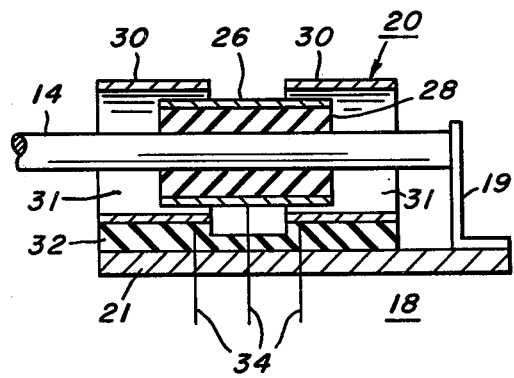
FIG. 2 is a partially sectioned side elevation of the differential capacitor employed by the embodiment of the invention illustrated in FIG. 1.

As illustrated, particularly in FIGS. 1 and 2, the means employed in mounting the end of the link 14 adjacent to the position detector 18 includes a vertically disposed flexible leaf 19. This leaf is coupled to the end surface of the link 14 and supports the end of the link adjacent a differential capacitor 20 which functions as the electrical sensing, and principal part of, the motion detector 18. The differential capacitor 20 and the leaf 19 are mounted on the surface of the specimen 12 by means of a suitable bracket 21 fixed to the surface of the specimen in a manner similar to that in which the bracket 16 is fixed to the surface of the specimen 12. The leaf 19 is mounted on the bracket 21 by any suitable means, including tack welds or the like. It is to be understood that the leaf 19 is, in operation, flexed in order to accommodate axial displacement of the end of the link 14 relative to the surface of the specimen 12.

While the principles of a differential capacitor are well known, it is to be understood that the differential capacitor 20, as employed by the various embodiments of the instant invention, includes a plurality of capacitor plates between which the capacitance is varied as displacement of the link 14, relative to the surface of the specimen 12, is achieved. A typical electrical diagram of a differential capacitor is illustrated in FIG. 3.

Figure 3:
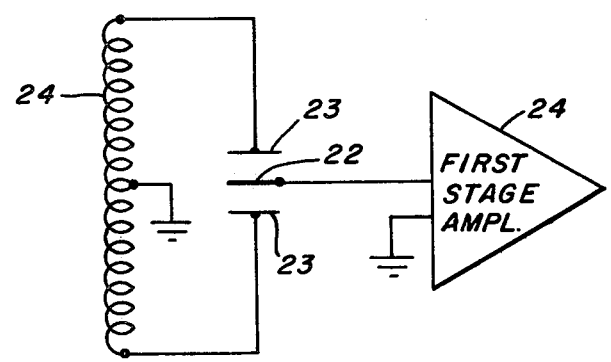
FIG. 3 is a simplified electrical diagram of a differential capacitor typifying the capacitors employed in the embodiments illustrated in FIGS. 1 and 4–7.

The differential capacitor illustrated in FIG. 3 includes a movable capacitor plate 22, disposed between a pair of fixed capacitor plates 23. The capacitor plates 23, in turn, are coupled to the opposite ends of a center-tapped secondary winding 24 of a carrier transformer. The capacitor plates 23 are fixed in mutually spaced relationship; while the capacitor plate 22 is displaceable therebetween for varying the capacitance established between the movable plate and the fixed plates. Hence, as the distance between the moving capacitor plate 22 and the fixed capacitor plates 23 is varied, a varying output signal is delivered from the capacitor to a first stage amplifier 24; whereupon the resulting signal can be delivered to a suitable filter and phase correction network, not shown, for further processing and utilization in a manner consistent with known capacitance detecting techniques. Since the signal processing circuits utilized in processing output signals of differential capacitors are well known, a detailed description of the circuits here employed is omitted in the interest of brevity.

As a practical matter, the differential capacitor 20, FIG. 2, is so formed as to include a metallic cylinder 26 mounted on, and insulated from the link 14. Mounting of the cylinder 26 is achieved through the use of suitable ceramic oxides, designated 28, so that the cylinder 26, in effect, serves as a moving capacitor plate as the link 14 experiences relative axial displacement resulting from mechanical strain in the specimen 12.

Disposed in coaxial relationship with the cylinder 26, and concentrically disposed about the link 14, is a pair of spaced tubular blocks 30. These blocks, in effect, function as the fixed capacitor plates and are provided with coaxially related bores 31 having a diameter slightly larger than the outside diameter of the cylinder 26. The blocks 30 are so positioned, relative to the cylinder 26, that the cylinder simultaneously is telescopingly displaced relative to each of the bores 31 as relative displacement is achieved between the link 14 and the specimen 12. This telescoping displacement serves simultaneously to vary the effective area of the external surface of the metallic cylinder 26 relative to the surface of the bores 31 of the blocks 30 so that the capacitance established between the external surface of the metallic cylinder 26 and the surface of each of the bores 31 is varied as telescoping displacement is imposed on the link 14. The tubular blocks 30 are supported in any suitable manner; however, it is preferred that the bracket 21 also serves to support the blocks through a mount 32 formed of ceramic oxides, similar to the ceramic oxides employed in mounting the metallic cylinder 26 on the link 14.

A capacitor circuit, including a first stage amplifier 24, is coupled with the cylinder 26 and blocks 30, which function in a manner similar to capacitor plates 22 and 23, FIG. 3.

Operation of the First Embodiment

In practice, the link 14 is supportingly mounted on the surface of the specimen 12, employing brackets 16 and 19, as illustrated in FIG. 1. The differential capacitor 20 is employed in providing an output signal to the excitation and signal conditioning electronics 33, through suitable leads 34, which serve to drive a recorder. Since the link 14 and the specimen 12 are provided with matched thermal expansion characteristics, the temperature of the environment serves to initiate an elongation, or contraction, such that the thermal expansion strain of the link 14 is commensurate with that of the specimen 12 as the link and the specimen simultaneously are thermally strained. Since the gage 10 and the specimen 12 are heated from the same source of heat, relative displacement initiated between the mechanically loaded specimen 12 and the link 14 is a function of mechanical strain; and, therefore, changes detected in the capacitance of the differential capacitor are initiated as a consequence of mechanically imposed strain. By detecting the changes in capacitance of the differential capacitor 20, the extent of the mechanical strain imposed on the specimen 12 is detected and can be determined through an empirical calibration of the gage.

Second Embodiment

Figure 4:
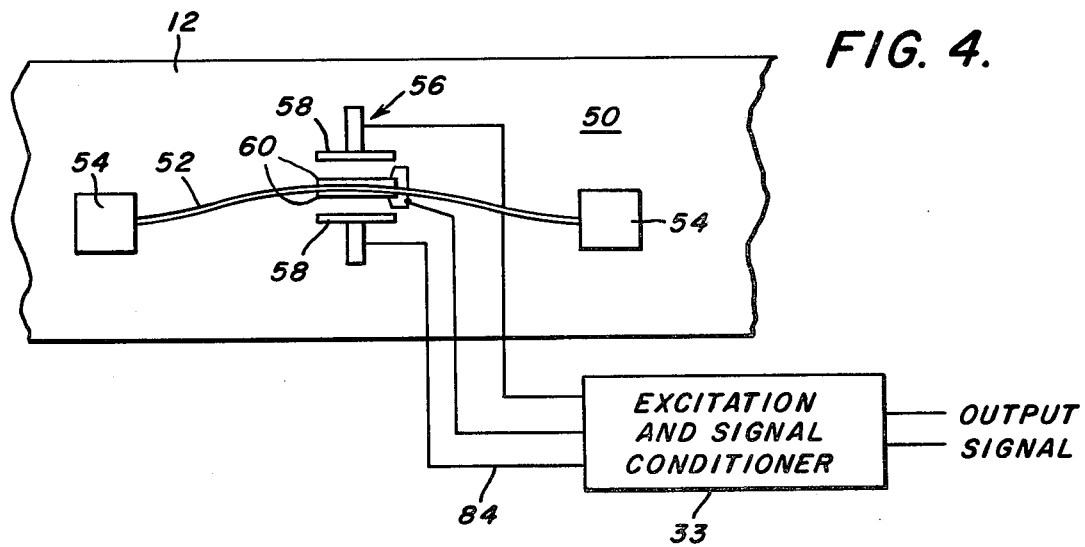
FIG. 4 is a diagrammatic view of a second embodiment of the instant invention.

A second embodiment of the invention, illustrated in FIG. 4, is particularly useful in instances wherein mechanical strain imposed on a specimen 12 involves minimal motion and therefore requires amplification of the resulting motion.

The strain gage 50 includes a flexible link 52 rigidly supported at its opposite ends by suitable mounting posts 54. These posts are fixed to the surface of a specimen 12 in a mutually spaced relationship, in a manner similar to that in which the brackets 16 and 20 in FIG. 1 are mounted. The link 52, however, is a thin, flexible, leaf-like member which is fabricated from a given material, preferably the material of the specimen 12. Hence, the link 52 also possesses thermal expansion characteristics which substantially match those of the specimen. In practice, the link 52 is formed in a bowed configuration as it is secured to the surface of the specimen 12 by the mounting posts 54. Of course, as can be appreciated, where desired the mounting posts 54 can be fabricated as a unitary portion of the link 52 so that the link, in effect, is configured to conform to an inverted U-shaped configuration.

The link 52 is deflected in lateral directions as the specimen 12 is axially strained. When the radius of curvature of the bow is large, this laterally directed deflection acts to amplify the resulting motion as strain is imposed on the specimen 12 between the posts 54. This motion then is detected through a differential capacitor 56, which possesses a mode of operation also conforming to that of the differential capacitor, illustrated in FIG. 3.

It is important to note that the capacitor 56 is so fabricated as to include a pair of fixed capacitor plates, designated 53, mounted in a manner such that the spacing established therebetween remains constant in dimension. A unitary pair of movable plates, designated 60, is fixedly mounted on the link 52, at opposite sides thereof, so that the pair of movable plates is oppositely and simultaneously displaced relative to the adjacent fixed plates 58 as lateral deflection is imparted to the link 52. Thus, the capacitor 56 serves to provide an output signal indicative of changes in its established capacitance for purposes of indicating the relative motion achieved by the link 52 as the link is flexed, or deflected, due to mechanical strain imposed on the specimen 12 between the posts 54.

It is important to note that the link 52 possesses thermal expansion characteristics which match those of the specimen 12. Therefore, ambient heat serves similarly to impose thermal expansion strain on both the specimen 12 and the link 52 so that the variation which occurs in the spacing of the plates 58 and 60 is a function of the mechanical strain imposed on the specimen 12.

Operation of the Second Embodiment

The mode of operation of the embodiment illustrated in FIG. 4 is similar to that of the embodiment shown in FIG. 1. It is, however, to be understood that the link 52 is a flexible member rigidly mounted at its opposite ends on a surface of the specimen 12 and that the link is, in operation, laterally deflected from an initial position as an axially directed mechanical strain is imposed on the specimen 12 between the posts 54. The imposed lateral deflection is, in effect, a magnification of axially directed, relative motion established between the link and the specimen as a consequence of mechanical strain. As deflection of the link 52 thus occurs, a variation in the spacing between the moving plates 60 and the adjacent fixed capacitor plates 58 is achieved.

Third Embodiment

Figure 5:
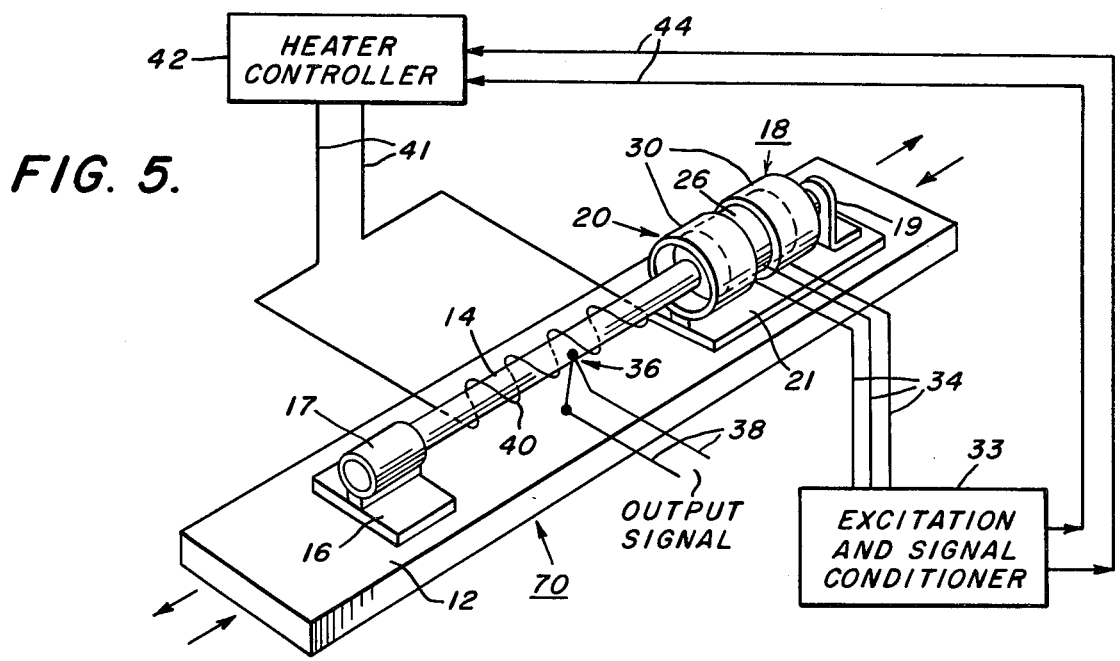
FIG. 5 is a perspective, diagrammatic view of a third embodiment of the instant invention which employs a heater and a differential capacitor.

Turning now to FIG. 5, there is illustrated a thermal-nulling strain gage 70 which is a third embodiment of the instant invention. The structure of this device is quite similar, in many respects, to the first embodiment illustrated in FIG. 1. However, the mode of operation of this embodiment substantially is different.

It should be noted that the third embodiment illustrated in FIG. 5 employs a heater and that a detected temperature differential is used to provide an electrical signal indicative of the difference between the thermal expansion strain achieved by the link 14 and that achieved by the specimen 12. This signal then is indicative of the mechanical strain imposed on the specimen at the instant the link 14 has been thermally expanded or contracted to achieve the length commensurate with the mechanically strained specimen 12. Conversely, the first embodiment of the invention, as illustrated in FIG.

1, relies on a constant temperature differential between the link 14 and the specimen 12 and the initiated change in capacitance of the differential capacitor 20, therefore, is employed to provide a signal which is indicative of mechanical strain.

In a manner similar to the first embodiment illustrated in FIGS. 1, 2 and 3, a differential capacitor circuit, including a first stage amplifier 24, is coupled with the cylinder 26 and blocks 30, which function in a manner similar to capacitor plates 22 and 23, FIG. 3, and is included within an excitation and signal conditioning circuit, generally designated 33, FIG. 5. The excitation and signal conditioner 33 is coupled with the differential capacitor 20 through suitable leads 34. In this third embodiment, however, the excitation and signal conditioner 33 also is connected with a heater controller, generally designated 42, through leads 44, which is in turn connected to a resistance heater coil 40, through leads 41.

Since the design and function of thermopiles as differential temperature sensors are well known, a detailed description is omitted in the interest of brevity. However, it is to be understood that the thermopile 36, as employed, includes a series of thermocouples having alternate terminals connected to the link 14 and the surface of the specimen 12 and is employed in detecting a temperature differential as it is established between the link 14 and the specimen 12 through an energization of the heater coil 40.

As illustrated, the heater coil 40 is wound about the link 14, however, it could be concentrically disposed within the link 14. Current through this coil is controlled through the heater controller 42 which, as a practical matter, is coupled with a suitable source of electrical energy, not shown. The current controller circuit 42 is of any suitable design and, in operation, is controlled by signals delivered from the excitation and signal conditioner 33 so that the flow of current through the coil 40 is, in effect, dictated by the output of the excitation and signal conditioner 33. Since the circuit which is employed in the heater controller is of any suitable design, a detailed description thereof is omitted.

Operation of the Third Embodiment

The operation of the thermal-nulling strain gage 70 can readily be understood when it is appreciated that the resistance heater coil 40 is employed to impart to the link thermal expansion strain which is equal to the mechanical strain imposed on the specimen 12 and that the position detector 18 serves to detect the relative position of the link 14 as it thermally is strained in response to a current flowing through the coil 40. Since the link 14 and the specimen 12 possess similar thermal expansion characteristics, ambient or environmental temperature tends to induce a similar strain in the link as in the specimen.

Hence, it is to be understood that the link 14 is mounted on the surface of a specimen 12 employing the brackets 16 and 21, and that the specimen 12 operatively is subjected to a mechanical load for thus imposing mechanical strain thereon. As strain occurs, relative displacement between the link 14 and the surface of the specimen 12 is experienced. This displacement, in turn, repositions the metallic cylinder 26 relative to the surfaces of the bores 31 of the tubular blocks 30, for thus varying the capacitance of the differential capacitor 20. The initiated change in capacitance is detected within the excitation and signal conditioner 33, whereupon a control signal is delivered through the leads 44 to the heater controller circuit 42 for causing the heater coil 40 to be energized and heated sufficiently for imparting thermal expansion strain to the link 14. As the link thermally is strained, the cylinder 26 is repositioned relative to the bores of the blocks 30, whereupon the initial capacitance of the differential capacitor 20 is re-established. As repositioning of the metallic cylinder 26 is achieved, the thermopile 36 continuously detects the temperature differential, as it is established between the link 14 and the specimen 12, so that at the instant the cylinder 26 is repositioned, for reestablishing the capacitance, the temperature differential is a known value. Since the thermal characteristics of the link 14 are known, and preferably matched with those of the specimen, the extent of thermal expansion strain imposed upon the link 14 is a known value. Since the thermal expansion strain thus imposed on the link 14 is equal to the mechanical strain imposed on the specimen 12, in repositioning the cylinder 26, the mechanical strain imposed on the specimen 12, through mechanical loading, becomes a known value.

It is to be understood, of course, that response of a thermal-nulling gage to compressive strains, necessitating an apparent thermal contraction strain, can be easily achieved by preheating the link 14, thus establishing a preselected temperature differential between the link 14 and the specimen 12. In this manner, the link 14 may be expanded to respond to tensile strain or contracted to respond to compressive strain by respectively applying more or less power to the heater.

Fourth Embodiment

Figure 6:
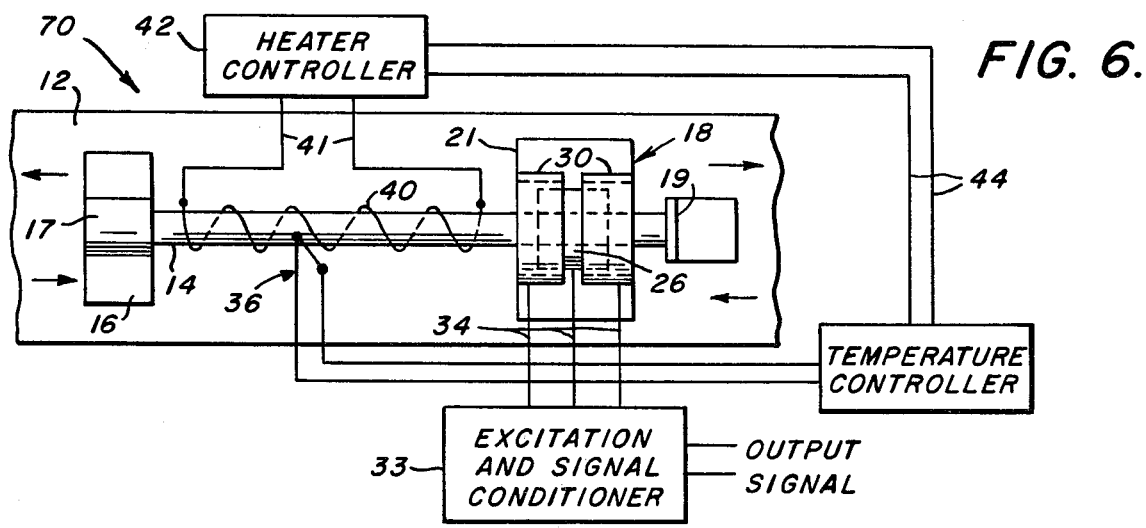
FIG. 6 is a top plan view of a fourth embodiment of the instant invention.

Turning now to FIG. 6, there is illustrated a strain gage 70 which is a fourth embodiment of the instant invention. The structure of this device is quite similar, in many respects, to the first embodiment illustrated in FIG. 1 and quite similar, in most respects, to the third embodiment illustrated in FIG. 5. However, the mode of operation of this embodiment substantially is different.

It should be noted that the third embodiment illustrated in FIG. 5 employs a detected temperature differential for purposes of providing an electrical signal indicative of thermal strain achieved by the link 14. This signal then is converted into intelligence indicative of the mechanical strain imposed on the specimen at the instant the link 14 has been thermally strained to achieve the length commensurate with the mechanically strained specimen 12. Conversely, the fourth embodiment of the invention, as illustrated in FIG. 6, attempts to maintain a constant temperature differential between the link 14 and the specimen 12. The initiated change in capacitance of the differential capacitor 20, therefore, is employed to provide a signal which is indicative of mechanical strain.

The embodiment depicted in FIG. 6 particularly is suited for use in instances wherein the test specimen 12 is subjected to changes in temperature. When changing temperatures are encountered, the specimen 12 necessarily experiences a change in its dimensions, due to changing thermal expansion effects. Where simultaneous mechanical and thermal expansion straining of the specimen 12 are encountered, it is imperative that the effects of thermal expansion strain be nullified in order to obtain an accurate measurement of the mechanical strain. Therefore, the heater coil 40 is utilized for initiating changes in the temperature of the link 14 in a manner such that the temperature of the link is caused to follow the temperature of the specimen 12.

It, therefore, is important to understand that the thermopile 36, as illustrated in FIG. 6, is employed in detecting thermal differentials established between the link 14 and the specimen 12, which, in the simplest case, is a zero differential. This condition is achieved simply by energizing the heater coil 40 sufficiently for causing the temperature of the link 14 to follow the temperature of the specimen 12. Consequently, the thermal expansion strain of the link 14 always matches the thermal expansion strain of the specimen 12. Any change in position, as detected by the differential capacitor 20, then is indicative of the mechanical strain imposed upon the specimen 12.

Operation of the Fourth Embodiment

The operation of the fourth embodiment of the invention illustrated in FIG. 6 is similar to the operation of the first embodiment illustrated in FIG. 1. The similarity is typified by the use of the differential capacitor 20 to provide a signal which is indicative of mechanical strain. The operation of the fourth embodiment is also similar to the operation of the third embodiment, illustrated in FIG. 5, with one important exception. This exception is typified by the transposed use of the differential capacitor signal and differential temperature signal. Instead of heating the link 14 in order to establish a temperature differential between the link and the specimen 12, sufficient to impart a greater thermal expansion strain to the link 14, the heater coil 40 is driven in a manner such as to establish a zero temperature differential between the link and the specimen.

It is to be understood, of course, that due to the various combinations of masses, orientation of the gage relative to external sources of heat, and for various similar reasons, it is possible to employ a preselected temperature differential, which is not zero, for achieving a desired matched thermal expansion of the link 14 and the specimen 12.

Fifth Embodiment

Figure 7:
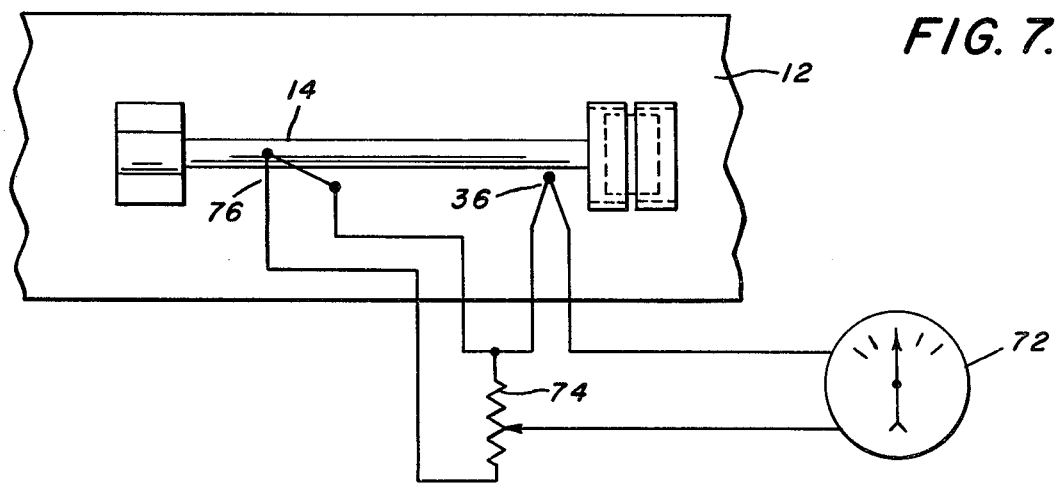
FIG. 7 illustrates a coupling of a thermopile or differential temperature sensor with an associated meter, as employed in detecting temperature differentials.

While the first four embodiments of this invention each describe complete physical devices for measuring mechanical strain, the fifth embodiment relates generally to the use of differential and total temperature sensor signals for providing various supplemental means to compensate for secondary thermal and non-linearity effects which result in gage output errors. Referring to FIG. 7, there is illustrated a differential temperature sensor 36, the output of which is a function of the temperature difference between the specimen 12 and the link 14 or flexible leaf 52, a total temperature sensor 76 the output of which is a function of the specimen 12 temperature and a strain gage which represents one of the first four embodiments. In this embodiment, the differential temperature sensor and the total temperature sensor output signals can be variously used individually and in combination and can be either combined electrically with the gage output signal or used to provide computational data to accomplish gage compensation.

It is important, of course, to understand that gage output errors can occur, for example, in devices such as those illustrated in FIG. 1 and FIG. 4 when the thermal expansion of the specimen 12 differs from the thermal expansion of the link 14 or flexible leaf 52. In the above, and other similar instances, the thermal expansion difference causing the gage output error can be easily related to the specimen temperature, or to the difference in temperature between the specimen 12 and the link 14 or flexible leaf 52, or to both. Since the temperature sensor outputs can be related to the gage output errors, the former can be used to compensate for the latter.

In devices such as the gage 70 illustrated in FIG. 5 and FIG. 6, a portion of the output of the total temperature sensor 76 shown in FIG. 7, can be combined with the output of the differential temperature sensor 36, representing the gage output signal, to compensate for differences between the thermal characteristics of the specimen 12 and the link 14.

Operation of the Fifth Embodiment

Referring again to FIG. 7, therein is illustrated one manner in which a portion of an electrical signal derived from temperature sensor 76 indicating the total temperature of the specimen 12 can be combined with the electrical signal derived from the differential temperature sensor 36 for providing gage compensation. This combining of signals is particularly advantageous for compensating strain gage response which results from either a difference in temperature or a mismatch between the thermal expansion coefficients of the line 14 or 52 and the specimen 12. A potentiometer 74 is employed to adjust a portion of a signal derived from a total temperature sensor 76 for combination with the signal derived from the differential temperature sensor 36 in order to effect gage output compensation as the temperature of the specimen is increased throughout the total operative range.

In view of the foregoing, it is to be understood that the various embodiments of the instant invention have utility in detecting mechanically induced strain through the use of a capacitive position detector. Such utility is particularly significant in instances wherein the specimen being tested operatively is subjected to extreme temperatures. Furthermore, the various embodiments are readily adaptable for use where the specimen is to be subjected to compression as well as to tension.

The specific embodiment employed in measuring strain for any given specimen is somewhat dependent upon the particular environment of the specimen. For example, where the ambient temperatures do not change rapidly, the embodiment illustrated in FIG. 1 serves quite satisfactorily, particularly where the imposed mechanical strain is significant. Of course, in the event the resulting motion induced by the mechanical strain is minimal, a motion magnification may be required. In such instances, the embodiment illustrated in FIG. 4 can readily be employed.

In instances wherein a gage being employed is subjected to rapidly changing temperatures, such as may be encountered upon the leading edge of aircraft or wind-tunnel models, the embodiment of FIG. 6 preferably is employed. In such instances, changing thermal conditions continuously are monitored and effects thereof are neutralized by driving the temperature of the link 14 in a manner such that it follows closely the temperature of the specimen 12. Hence, any relative motion achieved between the link 14 and the surface of the specimen 12 is a function of a mechanical strain.

Hence, the present invention provides a suitable solution to a perplexing problem, while yet providing a strain gage which functions simply, accurately and efficiently at excessively high temperatures over increased ranges.

Although the invention has been herein shown and described in what are conceived to be practical and preferred embodiments, it is recognized that departures may be made therefrom within the scope of the invention, which is not to be limited to the illustrative details disclosed.

We claim as our invention:

1. A strain gage for use in detecting and measuring mechanically induced strain in a specimen subjected to a mechanical stress comprising:

an elongated link extending along the surface of said specimen and having thermal expansion characteristics essentially the same as those of the specimen;

means affixing said link to the surface of said specimen such that the link is movable relative thereto when the specimen is mechanically stressed in a direction along the length of the link, said affixing means comprising a rigid bracket connecting one end of said link to said specimen and flexible leaf means operatively supporting the other end of the link in a manner that allows free movement of said other end of the link with respect to the specimen along the longitudinal axis of the link; and motion detecting means including a differential capacitor coupled with said other end of the link and said surface for detecting movement therebetween, the differential capacitor including an annular plate element on the link and an annular plate element affixed to the specimen, said annular plate elements being coaxial with the axis of said link, the respective plate elements being out of sliding frictional contact with any other element of the gage and the space between the two and the space around said link being empty except for nothing more than a gaseous medium having a dielectric constant which is essentially temperature invariant.

2. The strain gage of claim 1 including a differential temperature sensing means in contact with the specimen and said link for producing an electrical signal which varies as a function of any temperature differential between the two.

3. The strain gage of claim 1 wherein said link is tubular in configuration and said rigid bracket includes a unitary sleeve which serves as a receptacle for receiving therein one end of said link which is rigidly coupled with the sleeve.

4. A strain gage for use in detecting and measuring mechanically induced strain in a specimen subjected to a mechanical stress comprising:

an elongated link extending along the surface of said specimen and having thermal expansion characteristics essentially the same as those of the specimen;

means affixing said link to the surface of said specimen such that the link is movable relative thereto when the specimen is mechanically stressed in a direction along the length of the link, said affixing means comprising a rigid bracket connecting one end of said link to said specimen and flexible leaf means operatively supporting the other end of the link in a manner that allows free movement of said other end of the link with respect to the specimen along the longitudinal axis of the link;

motion detecting means including a differential capacitor coupled with said other end of the link and said surface for detecting movement therebetween, the differential capacitor including a plate element on the link and a plate element affixed to the specimen, the respective plate elements being out of sliding frictional contact with any other element of the gage and the space between the two being empty except for nothing more than a gaseous medium having a dielectric constant which is essentially temperature invariant;

electrical circuitry including said differential capacitor for producing a first electrical signal which varies as a function of the degree of movement between the link and the specimen;

temperature sensing means coupled with said link and said surface for producing a second electrical signal which varies as a function of any temperature differential between the specimen and said link; and electrical utilization apparatus coupled to said temperature sensing means.

5. The strain gage of claim 4 wherein said electrical utilization apparatus includes means responsive to said second electrical signal for varying said first electrical signal.

6. The strain gage of claim 4 including heater means for heating said link, and control means interconnecting said temperature sensing means and said heating means such that energization of said heating means to heat the link is controlled as a function of the temperature differential therebetween.

7. The strain gage of claim 6 wherein said control means is actuated to energize the heating means and heat the link until the temperature difference between the link and specimen is a constant preselected value.

8. The strain gage of claim 4 including heater means for heating said link, and control means interconnecting said motion detecting means and said heating means such that energization of said heating means to heat the link is controlled as a function of the output of the motion detecting means.

9. The strain gage of claim 8 wherein said control means is actuated to heat the link to cause the length of the link to change when the specimen is under stress.

10. The strain gage of claim 8 wherein said differential capacitor has a predetermined capacitance before said specimen is stressed, said predetermined capacitance being varied when the specimen is stressed, and wherein said control means acts to energize said heating means to heat the link when the specimen is stressed to change the length of the link until the capacitance of said differential capacitor again matches said predetermined capacitance.

* * * * *